US009032814B2

(12) United States Patent
Stange et al.

(10) Patent No.: US 9,032,814 B2
(45) Date of Patent: May 19, 2015

(54) MEASURING DEVICE AND METHOD FOR MEASURING THE FLOW RATE OF A MEDIUM FLOWING THROUGH A MEASURING TUBE

(75) Inventors: Gerd Stange, Nortorf (DE); Rainer Bollmann, Kiel (DE); Wolfgang Stade, Heikendorf (DE); Thomas Zelenka, Mönkeberg (DE)

(73) Assignee: Zylum Beteiligungsgesellschaft mbH & Co. Patente II KG, Schönefeld/Waltersdorf (DE)

( * ) Notice: Subject to any disclaimer, the term of this patent is extended or adjusted under 35 U.S.C. 154(b) by 268 days.

(21) Appl. No.: 13/643,736

(22) PCT Filed: Apr. 27, 2011

(86) PCT No.: PCT/EP2011/056617
§ 371 (c)(1),
(2), (4) Date: Jan. 4, 2013

(87) PCT Pub. No.: WO2011/134976
PCT Pub. Date: Nov. 3, 2011

(65) Prior Publication Data
US 2013/0098166 A1 Apr. 25, 2013

(30) Foreign Application Priority Data
Apr. 29, 2010 (EP) .................................. 10161420

(51) Int. Cl.
*G01F 1/58* (2006.01)
*G01F 1/60* (2006.01)
(52) U.S. Cl.
CPC . *G01F 1/584* (2013.01); *G01F 1/60* (2013.01)

(58) Field of Classification Search
CPC .................................... G01F 1/58; G01F 1/60
USPC ................ 73/861.12, 861.11, 861.14, 861.17
See application file for complete search history.

(56) References Cited

U.S. PATENT DOCUMENTS 4,434,666 A * 3/1984 Hemp et al. ............... 73/861.12
4,517,846 A 5/1985 Harrison et al.
(Continued)

FOREIGN PATENT DOCUMENTS

CN 101680790 A 3/2010
DE 10 2005 043 718 B3 4/2007
(Continued)

OTHER PUBLICATIONS

Int'l Preliminary Report on Patentability issued Oct. 30, 2012 in Int'l Application No. PCT/EP2011/056617.
(Continued)

*Primary Examiner* — Jewel V Thompson
(74) *Attorney, Agent, or Firm* — Panitch Schwarze Belisario & Nadel LLP

(57) ABSTRACT

A measuring device (1) is provided for measuring the flow rate of a medium (5) flowing through measuring tube (3). The measuring device (1) contains means for generating a constant magnetic field (B) perpendicular to the flow direction (v) of the medium (5) and at least two decoupling regions (7, 7') which are disposed in a plane (E) perpendicular to the flow direction (v) of the medium (5) on the wall (9) of the measuring tube (3). Each decoupling region (7, 7') comprises an electrode (13, 13') which has a non-metal porous layer (11) on the side facing the medium (5) and a measuring unit (19) for detecting a measuring signal. In the measuring device (1), the porous layer (11, 11') comprises an oxidic and/or non-oxidic ceramic material.

16 Claims, 1 Drawing Sheet

(56) References Cited

U.S. PATENT DOCUMENTS

| | | | |
|---|---|---|---|
| 4,604,905 A | | 8/1986 | Rademacher-Dubbick |
| 4,658,652 A | * | 4/1987 | Picone et al. ............. 73/861.12 |
| 5,224,394 A | * | 7/1993 | Kalinoski .................. 73/861.12 |
| 5,247,837 A | * | 9/1993 | Corpron .................... 73/861.12 |
| 5,337,607 A | * | 8/1994 | Brown ....................... 73/861.12 |
| 5,400,659 A | * | 3/1995 | Yokoi et al. ............... 73/861.12 |
| 5,773,723 A | * | 6/1998 | Lewis et al. ............... 73/861.12 |
| 5,852,247 A | * | 12/1998 | Batey ........................ 73/861.17 |
| 6,817,249 B2 | * | 11/2004 | Yamazaki .................. 73/861.12 |
| 6,931,943 B1 | | 8/2005 | Aundal |
| 7,028,558 B2 | | 4/2006 | Stange |
| 7,117,749 B2 | | 10/2006 | Turner |
| 7,930,945 B2 | | 4/2011 | Stange |
| 8,042,410 B2 | * | 10/2011 | Budmiger et al. ......... 73/861.12 |
| 2008/0184811 A1 | | 8/2008 | Stange |
| 2010/0101330 A1 | | 4/2010 | Stange |

FOREIGN PATENT DOCUMENTS

| | | |
|---|---|---|
| EP | 0113928 A1 | 7/1984 |
| EP | 1684053 A1 | 7/2006 |
| WO | 8504954 A1 | 11/1985 |
| WO | 9855837 A1 | 12/1998 |
| WO | 03098164 A1 | 11/2003 |
| WO | 2007031053 A2 | 3/2007 |
| WO | 2008107460 A1 | 9/2008 |

OTHER PUBLICATIONS

Int'l Search Report issued Jun. 6, 2011 in Int'l Application No. PCT/EP2011/056617.

Wintermantel, "Medizintechnik", Springer, Berlin, 5th Ed., p. 1338-1343 (2009).

Bergveld, "ISFET, Theory and Practice", IEEE Sensor Conference, Toronto, p. 1-26 (Oct. 2003).

English translation of an Office Action issued Jun. 4, 2014 in CN Application No. 201180021607.2.

* cited by examiner

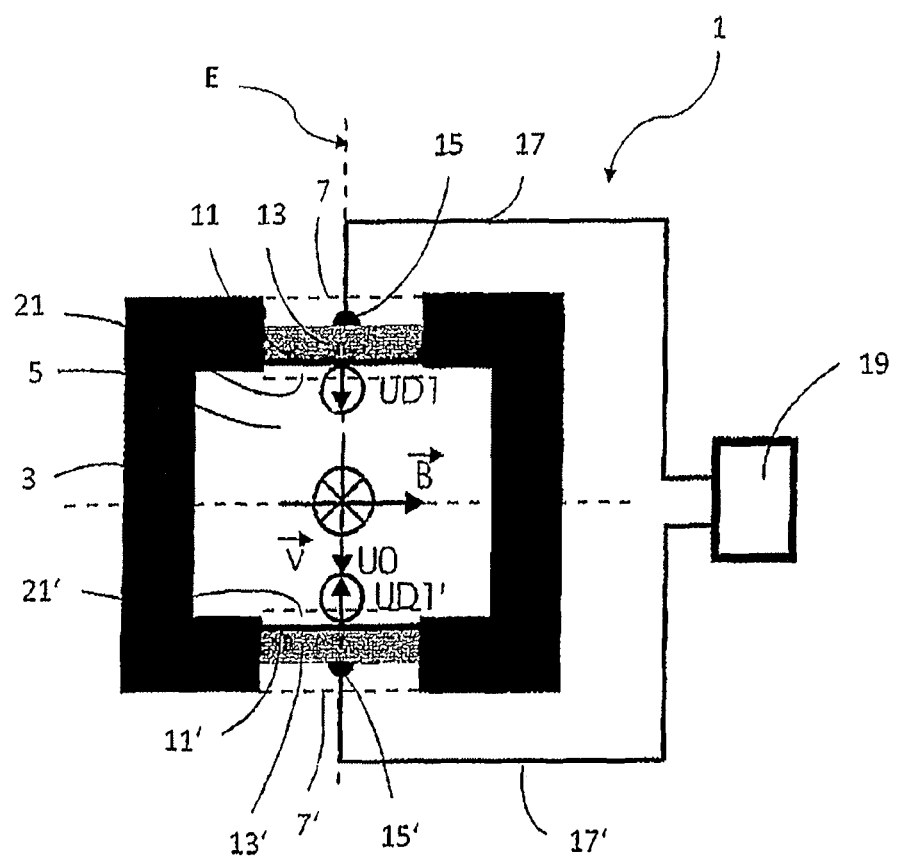

MEASURING DEVICE AND METHOD FOR MEASURING THE FLOW RATE OF A MEDIUM FLOWING THROUGH A MEASURING TUBE

CROSS-REFERENCE TO RELATED APPLICATIONS

This application is a Section 371 of International Application No. PCT/EP2011/056617, filed Apr. 27, 2011, which was published in the German language on Nov. 3, 2011, under International Publication No. WO 2011/134976 A1 and the disclosure of which is incorporated herein by reference.

BACKGROUND OF THE INVENTION

The invention relates to a measuring device as described below for measuring the flow velocity of a medium flowing through a measuring tube as well as to a method as described below for measuring the flow velocity of a medium flowing through a measuring tube.

Devices for magnetically-inductively measuring the flow velocity of a medium are known, for instance, from International patent application publications numbers WO 2008/107460 A1, WO 03/098164 A1 and WO 2007/031053 A2. They usually comprise means for generating a magnetic field perpendicular to the flow direction of the medium as well as electrodes arranged on a wall of a measuring tube in a plane perpendicular to the flow direction of the medium and via which electric voltage building up within the medium is detected. The measurement signal detected by means of the electrodes is then supplied to a measuring unit in which the measurement signal is evaluated.

Magnetic-inductive flow sensors (MID) utilize the fact that a medium flowing in a measuring tube penetrated by a magnetic field will induce an electric field which can be measured via the electrodes in the form of a voltage. Same is directly proportional to the flow velocity of the medium. Based on the flow velocity, the flux of the medium can then be calculated. A galvanic or capacitive signal pick-up can be used for signal decoupling in such measuring devices. Galvanic signal decoupling is mostly used, in which metallic electrodes of small diameters (in general, a few millimeters) equipped with feedthroughs through the inner tube wall are in direct (galvanic) contact with the medium. They need to be reliably sealed against the tube wall. This type of decoupling is characterized by a sturdy and simple construction, but is susceptible to chemical attack, deposits and abrasion of the electrodes and the seals. Controlling high operational temperatures requires careful coordination of the thermal expansion coefficients of the electrode and wall material.

In capacitive signal decoupling, the electrode is not in direct contact with the medium but is surrounded by an insulating layer which is in turn in contact with the medium.

Commercially available magnetic-inductive flow sensors work based on time-variable magnetic fields, so-called alternating fields, in order to eliminate interference signals superimposed on the usable signal and are differentiated according to rapidly changing noise and slowly changing drift components. The essential sources of these interference signals are time-variable, not precisely determinable double-layer potentials at the interface between the flow medium and the coupling element, i.e., in particular the electrode. To take these signal components into account, current-energized field coils are required which are mostly operated in a pulsed mode; i.e., clocked. A time-variable magnetic field of a known magnitude is required in both galvanic as well as capacitive decoupling of measurement signals, entailing additional energy expenditure in generating the magnetic fields. Such measuring devices with alternating fields also only allow a discontinuous measuring with the pulse repetition frequency of the magnetic field. The required pulse repetition frequency of the magnetic field furthermore depends on the frequency spectrum of the interference voltages. Therefore, there are efforts to develop measuring devices which do not require time-variable magnetic fields but make do with one permanent magnet while still enabling the suppression of interference signals.

Due to their considerable influence on measuring accuracy, approaches to create magnetic-inductive systems and components for signal decoupling in magnetic-inductive flow sensors are known which have considerably more favorable properties in terms of their noise and drift behavior than conventional measuring devices comprising purely metallic electrodes of a galvanic signal decoupling structure. Examples of this are described in U.S. Pat. No. 4,517,846 and International patent application publication number WO 98/55837 A1. Both propose coating metallic electrodes with very hard metal oxides such that the flow medium only comes into direct contact with this layer, the latter being of an electrically insulating yet porous structure. This porous structure can be produced in the layer manufacturing process itself or else by subsequent selective processing.

Such a porous layer has the advantage of a noise-reducing and drift-reducing effect defined by medium penetrating into the porous structure. The porous structure creates an enlarged contact surface between the medium flowing within the measuring tube and the solid body, hence the signal decoupling structure. Furthermore, ion channels form within the pores, providing conductivity to the intrinsically insulating layer. The layer is moreover attributed to the capacity of ion storage, which serves as a charge buffer and thus has a noise and drift-reducing effect.

More recent literature also reports on fractal surface structures of layers, e.g., of titanium nitride, which are used with great success in medical technology as noise and drift-reducing layers for signal coupling and decoupling—e.g., in cardiac pacemakers (see E. Wintermantel, "Medizintechnik", Springer, Berlin, 5$^{th}$ edition, pp. 1338-1343 (2009)). Similar solutions can be expected to also be suitable for signal decoupling from a magnetic-inductive flow sensor and leading to a further suppression of the electrochemically induced noise, drift and step signals there.

It is further desirable to create a magnetic-inductive flow sensor which does not depend on a current flow in the medium. No-current measurement has decisive advantages. In particular, once charge balances have been adjusted, measurements will not disturb them since there is no associated substance transport whatsoever. This has an advantageous effect in terms of further reducing drift. Although most methods for signal decoupling in magnetic-inductive flow sensors require a current flow, a no-current approach is known from German Patent DE 10 2005 043 718 B3. This describes measuring via a purely electric field effect ensuing from the medium flowing in the measurement tube interacting with the magnetic field. The electric field has in this case a controlling effect on the resistance of an adjacent semiconductor. In a specific configuration here, a pair of ISFETs (ion-sensitive field-effect transistors) takes over the signal decoupling, wherein the transistor gate electrodes provided with an insulating layer are each in contact with the flowing medium. In the simplest case, the insulating layer on the gate electrode consists of silicone dioxide. This material is known for being able to store and release H$^{+}$ ions from its surface (P. Bergveld, "ISFET, Theory and Practice," IEEE Sensor Conference, Toronto; pp. 1-26 (October 2003)), thereby resulting in a balance of the surface charge contingent upon the pH value of the flowing medium and a double layer voltage induced by said surface charge. The surface of the insulating substance acts like a charge accumulator which stabilizes the double layer voltage due to its buffer action and thus contributes effectively to noise suppression. The supply voltage—superimposed by the difference in the double layer voltage—is measured between the gates of the ISFET pair while the ISFET path resistances are controlled by same.

As stated above, no-current measurement particularly has the decisive advantage that once set, charge balances will not be disturbed by a measurement since there is no substance transport whatsoever associated with the measurement. In practice, however, every insulating substance has a low but finite conductivity so that a no-current measurement is in reality only approximated. The described ISFET system for signal decoupling can therefore also be understood as a combination of a pair of ion storage layers and a differential amplifier having an extremely high input resistance.

The measuring devices for magnetic-inductive measuring described above and known from the prior art have the disadvantage of separately optimizing the measuring device with regard to minimizing noise and interference signals as well as not being possible to realize virtually no-current measurement.

It is therefore the task of the present invention to create a measuring device and a method for measuring the flow velocity of a medium flowing through a measuring tube which combines the advantages of virtually no-current field measurement with the advantages of signal decoupling via non-metallic layers and which can be operated with permanent magnets.

A measuring device having the characterizing features described below is proposed to solve this task. Advantageous configurations of the measuring device are also described below.

BRIEF SUMMARY OF THE INVENTION

According to the invention, means for generating a constant magnetic field perpendicular to the flow direction of the medium is provided for measuring the flow velocity of a medium flowing through a measuring tube. A measuring device according to the invention furthermore comprises at least two preferably opposing decoupling regions which are disposed in a plane perpendicular to the flow direction of the medium on the wall of the measuring tube, wherein each decoupling region comprises an electrode having a porous layer on its side facing the medium. The porous layer can exhibit a pore structure or a fractal structure and is preferably of a non-metallic, hard, mechanical nature. Preferably, the layer completely covers the side of the electrode facing the medium and thus electrically insulates the electrode from the medium. The porous layers can consist of a metal oxide, a metal nitride or a metal carbide, but it is also conceivable for the layer to be formed from plastic. Preferably, the thickness of the porous layer essentially corresponds to the wall thickness of the measuring tube. Moreover, the porous layer is preferably applied to the electrodes in situ. Lastly, a measuring unit is provided for detecting a measurement signal which can be or comprise an amplifier, particularly a differential amplifier. The means for generating a constant magnetic field perpendicular to the flow direction of the medium is preferably a permanent magnet in order to enable continuous measuring. The decoupling regions form a measuring path serving to decouple the measurement signal which, at the interface with the medium present in the measuring tube, leads across the non-metallic porous layer in direct contact with the flowing medium on its side facing the medium and is fixedly connected to a conductive carrier material on its rear side, namely the electrode, which at the same time serves to output the measurement signal to the outside. The measurement signal is ultimately fed to a measuring and evaluating unit. The invention is characterized in that the porous layer comprises an oxidic and/or non-oxidic ceramic material.

A specific further development of the invention provides for the measuring unit to comprise an input resistance of at least 100 gigaohm (G$\Omega$).

Preferably, the measurement path is configured so that the metallic electrodes of a decoupling region covered by the non-metallic layer are immersed into the medium flowing in the measuring tube such that only the non-metallic layer is in direct contact with the medium, and the metallic terminals, i.e., the electrodes, are in direct connection with a measuring unit, in particular an instrumentation amplifier which has an input resistance of at least 100 G$\Omega$.

For solving the task cited above, a method for measuring the flow velocity of a medium flowing through a measuring tube having the characterizing features of claim 15 is also proposed, in which a constant magnetic field penetrates the medium perpendicular to its flow direction. The electric voltage building up in the medium is detected by means of electrodes which are disposed on a wall of the measuring tube in a plane perpendicular to the flow direction of the medium. The electrodes are covered by a non-metallic porous layer. The method according to the invention is characterized in that the measurement signal is supplied to a measuring unit, in particular a differential amplifier, whereby the measuring unit has an input resistance of at least 100 G$\Omega$. This results in the associated measuring device having the advantages cited above.

The present invention hence allows the above advantages of signal decoupling via layers, as described for example in U.S. Pat. No. 4,517,846 and International Patent Application Publication No. WO 98/55837 A1, to be combined with the advantages of virtually no-current measurement, in that the signals decoupled via non-metallic porous layers are supplied to an external measuring device of extremely high resistance, in particular a differential amplifier. In contrast to the signal decoupling via the ISFETs proposed in German Patent DE 10 2005 043 718 B3, the present invention enables minimizing noise and interference signals by means of separately optimizing the layers on the one hand and the differential amplifier on the other. Modern amplifier development associated with advances in the field of ceramic materials, and in particular in the field of thin films, i.e., layers in the range of micrometers down to nanometers of thickness, thus engender the prerequisites for an extremely low noise and drift signal decoupling according to the invention.

The device according to the invention was successfully tested using porous layers of the oxidic ceramics silicone dioxide, in particular $SiO_2$, alumina, in particular $Al_2O_3$, and titanium oxide, in particular $TiO_2$. For this purpose, layers of different thicknesses, in particular of several 10 micrometers down to a few nanometers were applied to the electrode sides facing the medium in different manufacturing processes. Thicker $SiO_2$ layers, for instance, were manufactured by grinding technology, whereas the thinner layers were produced by means of customary semiconductor technology processes such as, for example, plasma deposition or sputtering. Extremely thin $TiO_2$ layers of less than 1 nanometer in thickness were produced by boiling for several hours.

It was moreover determined that even non-oxidic ceramic materials such as, for example, silicone nitride, in particular $Si_3N_4$, and silicone carbide, in particular SiC, have similarly excellent properties for the intended application in magnetic-inductive flow sensors. It will be an important goal of further tests to complete the list of candidate materials.

An instrumentation amplifier having an input resistance of 120 GΩ was used in all of the described cases. The permanent magnets employed based on the SmCo and NdFe rare earths enable magnetic flow densities of up to B=0.5 T in the medium and lead to a typical usable signal of almost 10 mV at a 1 m/s medium flow velocity. The magnetic field is hence about two orders of magnitude greater than that of market-standard devices. Due to the very low currents of femtoampere magnitude flowing within the measuring circuit, signals largely free of noise and drift may be obtained with the cited coatings, allowing flow velocities to be measured continuously with a permanent magnet-operated MID for the first time.

It should be particularly emphasized that the extremely high magnetic flow densities of modern permanent magnet materials may only be electromagnetically generated by directly water-cooled conductors. Since the usable signal of a MID is proportional to this flow density, the already low noise amplitudes according to the invention have a particularly strong action toward a high usable signal-to-noise ratio. It is therefore advantageous to realize magnetic flow densities of at least 0.1 T in the measuring tube. It is particularly advantageous to use permanent magnets for this purpose since the device according to the invention does not depend on employing alternating fields for its operation.

In summary, the device according to the invention permits for the first time flow processes to be continuously measured magnetically-inductively at simultaneous highest resolution, i.e., a particularly good suppression of noise and drift signals. Furthermore, the device according to the invention is characterized by a simple and cost-efficient construction.

BRIEF DESCRIPTION OF THE SEVERAL VIEWS OF THE DRAWINGS

The foregoing summary, as well as the following detailed description of the invention, will be better understood when read in conjunction with the appended drawing. For the purpose of illustrating the invention, there are shown in the drawing embodiments which are presently preferred. It should be understood, however, that the invention is not limited to the precise arrangements and instrumentalities shown. The invention will be explained in greater detail hereinafter based on the drawing.

In the drawing:

FIG. 1 shows a schematic cross-section of a measuring device 1 according to one embodiment of the invention.

DETAILED DESCRIPTION OF THE INVENTION

As shown in FIG. 1, measuring device 1 comprises a measuring tube 3 through which a medium 5 flows in a flow direction v which is depicted here as pointing perpendicularly into the image plane by way of example. A magnetic field B perpendicularly penetrates the medium 5 flowing into the image plane depicted in the FIGURE as pointing from left to right as an example. Due to the interaction of the magnetic field B and the flowing medium 5, a voltage $U_0$ proportional to the volume flow is induced in the medium 5 as a so-called usable signal. For this purpose, the measuring device 1 comprises means for generating a constant magnetic field B perpendicular to the flow direction of the medium 5. The means for generating a magnetic field B is preferably permanent magnets (not shown in the FIGURE). By using permanent magnets, the medium will be penetrated by a continuous magnetic field, not an alternating field, and therefore permits the flow velocity of the medium 5 to be measured continuously.

The measuring device 1 moreover comprises two decoupling regions 7, 7' which are disposed in a plane E perpendicular to the flow direction of the medium 5 on the wall 9 of the measuring tube 3. Each decoupling region 7, 7' is preferably integrated into the wall 9 of the measuring tube 3 and comprises a non-metallic porous layer 11, 11' and a carrier layer in the form of an electrode 13, 13', wherein the non-metallic porous layer 11, 11' preferably completely covers the sides of the electrodes 13, 13' facing the medium 5. The electrodes 13, 13' are conductive and serve to mechanically support the structure and the signal outputs to the outside. The non-metallic layer 11, 11' can comprise a metal oxide, a metal nitride or a metal carbide. "Non-metallic" in this context means that the porous layer, in contrast to the electrodes 13, 13', does not comprise any pure metal but rather consists of a material which has no metallic properties, in particular no good conductivity, and instead acts as electrically insulating. The porous layer 11, 11' preferably exhibits low pass characteristics due to a coordinated selection of its specific electric resistance and electric coefficient.

The layer 11,11' is preferably a non-metallic porous layer having a pore structure or a fractal structure and is formed to be mechanically hard. On the side of the electrodes 13, 13' facing away from the layer 11, 11', hence on the side facing away from the medium 5, a terminal 15, 15' is in each case attached to the electrode 13, 13' which serves to decouple the detected voltage $U_0$. The thus decoupled voltage is in each case supplied to a measuring unit 19 via a connection 17, 17', with the measuring unit 19 being or comprising a measuring amplifier or a differential amplifier.

An interface 21, 21' as described in the introductory part is respectively formed between layer 11, 11' and medium 5, in the interior of which the ion balance between the medium 5 and the layer 11, 11' is established by a corresponding interaction. Furthermore, double layer voltages $UD_1$ and $UD_1'$ form in the interfaces 21, 21' of each decoupling region 7, 7'. The usable signal $U_0$ is decoupled together with the double layer voltages $UD_1$, $UD_1'$, which act as an interference signal, via the two symmetrically arranged decoupling regions 7, 7' and supplied to the highly resistive measuring amplifier, respectively measuring unit 19, via the terminals 6, 6' and further the connections 17, 17'.

It is also conceivable for the porous layer 11, 11' to be integrated into the wall 9 of the measuring tube 3. The decoupling regions 7, 7' comprising the electrode 13, 13' and the porous layer 11, 11', can, however, also be realized as compact constructional elements and simply be inserted in corresponding openings in the wall 9 of a measuring tube 3 of a magnetic-inductive flow sensor, a measuring device 1.

The FIGURE clearly shows that the porous layers 11, 11' are arranged symmetrically with respect to the measuring tube 3. Thus, the measurement signal is decoupled via the two symmetrically arranged porous layers 11, 11' such that interference signals, in particular the double layer voltages $UD_1$, $UD_1'$ of both "symmetry halves;" i.e., of both decoupling regions 7, 7', largely compensate the difference, whereas the usable signal $U_0$ results as a full-level signal as the sum of the signals of each respective half of the amplitude of the two "symmetry halves."

According to the invention, the measuring unit 19 exhibits an input resistance of at least 100 GΩ, preferably 120 GΩ. This allows obtaining signals largely free of noise and drift, permitting continuous measuring of the flow velocity to be realized for the first time with a permanent magnet-operated measuring device 1.

It can be stated in summary that the present invention combines the advantages of virtually no-current field measurement with the advantages of signal decoupling via non-metallic layers and the measuring device thereby created can moreover be operated by a permanent magnet so that considerable energy savings can be realized.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A measuring device (1) for measuring a flow velocity of a medium (5) flowing through a measuring tube (3), the measuring device (1) comprising:
   means for generating a constant magnetic field (B) perpendicular to a flow direction (v) of the medium (5);
   at least two decoupling regions (7, 7') disposed on a wall (9) of the measuring tube (3) in a plane (E) perpendicular to the flow direction (v) of the medium (5), wherein each decoupling region (7, 7') comprises a respective electrode (13, 13') having a porous layer (11, 11') on a side facing the medium; and
   a measuring unit (19) for detecting a measurement signal, wherein the porous layer (11, 11') comprises an oxidic and/or non-oxidic ceramic material, completely covers the side of the electrode facing the medium, and electrically insulates the electrode from the medium.

2. The measuring device (1) according to claim 1, wherein the measuring unit (19) has an input resistance of at least 100 gigaohm.

3. The measuring device (1) according to claim 1, wherein the means for generating a magnetic field (B) generates a flow density of at least 0.1 tesla within the measuring tube (5).

4. The measuring device according to claim 1, wherein the means for generating a magnetic field (B) includes a permanent magnet comprising a material selected from the group consisting of rare earths, preferably SmCo and NdFe.

5. The measuring device according to claim 1, wherein the porous layer (11, 11') comprises a metal oxide.

6. The measuring device according to claim 1, wherein the porous layer (11, 11') comprises a metal nitride.

7. The measuring device according to claim 1, wherein the porous layer (11, 11') comprises a metal carbide.

8. The measuring device according to claim 1, wherein the porous layer (11, 11') comprises plastic.

9. The measuring device according to claim 1, wherein the porous layer (11, 11') has a pore structure or a fractal structure.

10. The measuring device according to claim 1, wherein a thickness of the porous layer (11, 11') essentially corresponds to a wall thickness of the measuring tube (3).

11. The measuring device according to claim 1, wherein the porous layer (11, 11') is applied to the electrode (13, 13') in situ.

12. The measuring device according to claim 1, wherein the decoupling region (7, 7') is mounted in the measuring device (1) as a constructional element.

13. The measuring device according to claim 1, wherein the porous layer (11, 11') is integrated into the wall (9) of the measuring tube (3).

14. The measuring device according to claim 1, wherein the porous layers (11, 11') are symmetrically arranged, and wherein the measurement signal is decoupled via the two symmetrically arranged porous layers (11, 11') such that interference signals of both decoupling regions (7, 7') largely compensate the difference, and wherein the usable signal ($U_0$) is a full-level signal and is the sum of the signals from each respective half amplitude of the two decoupling regions (7, 7').

15. The measuring device according to claim 1, wherein the porous layer (11, 11') exhibits low pass characteristics due to a coordinated selection of its specific electric resistance and electric coefficient.

16. A method for measuring flow velocity of a medium (5) flowing in a measuring tube (3), the method comprising:
   causing the medium (5) to be penetrated by a constant magnetic field (B) perpendicular to a flow direction of the medium (5); and
   detecting electric voltage ($U_0$) building up in the medium (5) via an electrode (13, 13') disposed on a wall (9) of the measuring tube (3) in a plane (E) perpendicular to the flow direction,
      wherein the electrode (13, 13') is covered in the flow direction of the medium (5) by a porous layer (11, 11') which comprises an oxide and/or non-oxidic ceramic material, completely covers a side of the electrode facing the medium, and electrically insulates the electrode from the medium, and
      wherein a measurement signal is supplied to a measuring unit (19) having an input resistance of at least 100 gigaohm.

* * * * *